United States Patent [19]
Lee

[11] Patent Number: 5,751,362
[45] Date of Patent: May 12, 1998

[54] APPARATUS FOR ENCODING A VIDEO SIGNAL USING FEATURE POINT BASED MOTION ESTIMATION

[75] Inventor: Min-Sup Lee, Seoul, Rep. of Korea

[73] Assignee: Daewoo Electronics, Co., Ltd., Seoul, Rep. of Korea

[21] Appl. No.: 544,355

[22] Filed: Oct. 17, 1995

[30] Foreign Application Priority Data

Apr. 29, 1995 [KR] Rep. of Korea ............... 95-10584

[51] Int. Cl.$^6$ ................................ H04N 7/32; H04N 7/30
[52] U.S. Cl. ................. 348/416; 348/699; 348/402; 348/407; 348/413; 348/409
[58] Field of Search ................. 348/699, 416, 348/413, 407, 402, 409, 412, 390, 415, 700; H04N 7/32, 7/30

[56] References Cited

U.S. PATENT DOCUMENTS

| | | | |
|---|---|---|---|
| 5,048,112 | 9/1991 | Alves et al. | 382/233 |
| 5,237,410 | 8/1993 | Inoue | 348/409 |
| 5,295,201 | 3/1994 | Yokohama | 348/416 |
| 5,537,155 | 7/1996 | O'Connell et al. | 348/416 |
| 5,546,129 | 8/1996 | Lee | 348/416 |
| 5,581,308 | 12/1996 | Lee | 348/699 |
| 5,592,228 | 1/1997 | Dachiku et al. | 348/416 |
| 5,598,215 | 1/1997 | Watanabe | 348/416 |
| 5,608,458 | 3/1997 | Chen et al. | 348/413 |
| 5,638,129 | 6/1997 | Lee | 348/416 |

FOREIGN PATENT DOCUMENTS

| | | | |
|---|---|---|---|
| 0514053 | 11/1992 | European Pat. Off. | H04N 7/32 |
| 0590800 | 4/1994 | European Pat. Off. | H04N 7/30 |
| 0632657A1 | 1/1995 | European Pat. Off. | H04N 7/32 |
| 0643533 | 3/1995 | European Pat. Off. | H04N 5/14 |
| 63-155888 | 6/1988 | Japan | H04N 7/30 |
| 9203799 | 3/1992 | WIPO | G06F 15/66 |
| WO 92/03799 | 3/1992 | WIPO | G06F 15/66 |

OTHER PUBLICATIONS

"A New Motion Compensation Method for Image Sequence Coding Using Hierarchical Grid Interpolation". Huang et al, IEEE Trans. on Cir. and Sys. for Video Technology, vol. 4, No. 1, Feb. 1994, pp. 42–51.

"An Iterative Motion Estimation Method Using Triangular Patches for Motion Compensation", Nakaya et al. SPIE, vol. 1605, Visual Communications and Image Processing '91, pp. 546–557, 1991.

"A Novel Video Coding Scheme Based On Temporal Prediction Using Digital Image Warping", Nieweglowski et al, IEEE Trans. on Consumer Electronics, vol. 29, No. 3, Aug. 1993, pp. 141–150.

"Motion Compensation for Video Compression Using Control Grid Interpolation", Sullivan et al, ICASSP 1991, pp. 2713–2716.

Nieweglowski J. et al., "A Novel Video Coding Scheme Based on Temporal Prediction Using Digital Image Warping" IEEE Transactions On Consumer Electronics, vol. 39, No. 3, 1 Aug. 1993, pp. 141–150.

Primary Examiner—Tommy P. Chin
Assistant Examiner—Vu Le

[57] ABSTRACT

A motion-compensated video signal encoder has a circuit for determining a predicted current frame based on a current frame and a previous frame of a digital video signal. The circuit includes a region detection circuit for detecting a processing region encompassing a moving object from the previous frame based on a difference between the current and the previous frames to generate region information representing the detected processing region. Therefore, a number of pixels is selected from the pixels contained in the detected processing region as feature points based on the region information. A first set of motion vectors between the current and the previous frames, each of the first set of motion vectors representing a motion for each of the selected pixels is then detected. The first set of motion vectors is used for predicting the predicted current frame and transmitted as a set of motion vectors of the video signal together with the region information.

15 Claims, 8 Drawing Sheets

APPARATUS FOR ENCODING A VIDEO SIGNAL USING FEATURE POINT BASED MOTION ESTIMATION

FIELD OF THE INVENTION

The present invention relates to an apparatus for encoding a video signal; and, more particularly, to an apparatus capable of effectively encoding a video signal by using a feature point based motion estimation.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse coded modulation), two-dimensional DCT(discrete cosine transform), quantization of DCT coefficients, and VLC(variable length coding). The motion compensated DPCM is a process of estimating the movement of an object between a current frame and a previous frame, and predicting the current frame according to the motion flow of the object to produce a differential signal representing the difference between the current frame and its prediction.

The two-dimensional DCT, which reduces or removes spatial redundancies between image data such as motion compensated DPCM data, converts a block of digital image data, for example, a block of 8×8 pixels, into a set of transform coefficient data. This technique is described in, e.g., Chen and Pratt, "Scene Adaptive Coder", *IEEE Transactions on Communications*, COM-32, No. 3(March 1984). By processing such transform coefficient data with a quantizer, zigzag scanning, and VLC, the amount of data to be transmitted can be effectively compressed.

Specifically, in the motion compensated DPCM, current frame data is predicted from corresponding previous frame data based on an estimation of the motion between the current and the previous frames. Such estimated motion may be described in terms of two dimensional motion vectors representing the displacement of pixels between the previous and the current frames.

There have been two basic approaches to estimate the displacement of pixels of an object. Generally, they can be classified into two types: one is a block-by-block estimation and the other is a pixel-by-pixel approach.

In the block-by-block motion estimation, a block in a current frame is compared with blocks in the previous frame until a best match is determined. From this, an interframe displacement vector (how much the block of pixels has moved between frames) for the whole block can be estimated for the current frame being transmitted. However, in the block-by-block motion estimation, blocking effect at the boundary of a block may occur in a motion compensation process; and poor estimates may result if all pixels in the block do not move in a same way, to thereby decrease the overall picture quality.

Using a pixel-by-pixel approach, on the other hand, a displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined at each and every pixel, it is virtually impossible to transmit all of the motion vector data to a receiver.

One of the techniques introduced to ameliorate the problem of dealing with the surplus or superfluous transmission data resulting from the pixel-by-pixel approach is a feature point based motion estimation method.

In the feature point based motion estimation technique, motion vectors for a set of selected pixels, i.e., feature points, are transmitted to a receiver, wherein the feature points are defined as pixels of a previous frame or a current frame capable of representing a motion of an object so that motion vectors for pixels of a current frame can be recovered or approximated from those of the feature points in the receiver. In an encoder which adopts the motion estimation based on feature points, disclosed in a commonly owned copending application, U.S. Ser. No. 08/367,520, entitled "Method and Apparatus for Encoding a Video Signal Using Pixel-by-Pixel Motion Estimation", a number of feature points are first selected from all of the pixels contained in the previous frame using a grid or/and edge detection technique. Then, motion vectors for the selected feature points are determined, wherein each of the motion vectors represents a spatial displacement between one feature point in the previous frame and a corresponding matching point, i.e., a most similar pixel thereto, in the current frame. Specifically, the matching point for each of the feature points is searched in a search region within the current frame, wherein the search region is defined as a region of a predetermined area which encompasses the position of the corresponding feature point.

Even though it is possible to greatly reduce the amount of data to be transmitted through the use of the aforementioned feature point based motion estimation technique, a great deal of feature points is still selected from not only the moving objects but also stationary objects having no motion in case of using the grid or/and edge technique. The large number of feature points may require a rather complex circuitry to support the above encoding method, or still impose a high level of computational burden on the circuitry for detecting the motion vectors therefor. Furthermore, it may be required to further reduce the volume of data to be transmitted in order to successfully implement a low-bit rate codec system having, e.g., 64 kb/s transmission channel bandwidth.

SUMMARY OF THE INVENTION

It is, therefore, a primary object of the invention to provide an improved video signal encoding apparatus for use with a low-bit rate video coding system, which is capable of effectively encoding a video signal by estimating a set of motion vectors selected from region encompassing a moving object in a video signal through the use of feature point based motion estimation.

In accordance with the present invention, there is provided an apparatus, for use in a motion-compensated video signal encoder, for determining a predicted current frame based on a current frame and a previous frame of a digital video signal, comprising: region detection block for detecting a processing region encompassing a moving object from the previous frame based on the difference between the current and the previous frames to generate region information representing the detected processing region; feature point selection block for selecting a number of pixels from the pixels contained in the detected processing region as feature points based on the region information; first motion vector detection block for detecting a first set of motion vectors between the current and the previous frames, each of the first set of motion vectors representing a motion for each of the selected pixels; second motion vector detection block for producing a second set of motion vectors for all of the pixels contained in the current frame by using said first set of motion vectors; and motion compensation block for assigning the value of each of the pixels in the previous frame, each of the pixels corresponding to one of the pixels in the current frame through one of the second set of motion vectors, as the value of said one of the pixels in the current frame, to thereby determine the predicted current frame.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
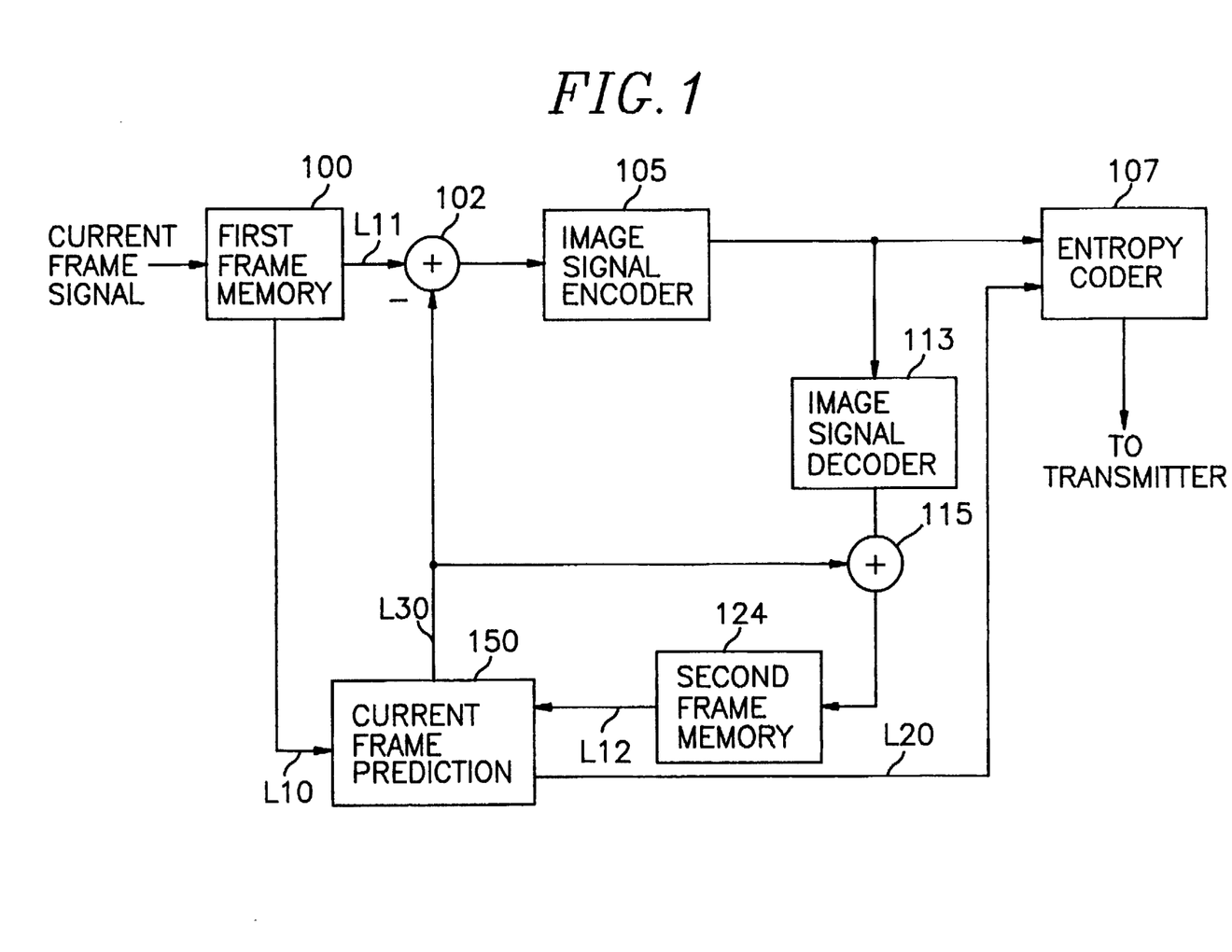
FIG. 1 provides an image signal encoding apparatus having a current frame prediction block in accordance with the present invention.

Referring to FIG. 1, there is shown an encoding apparatus for compressing a digital video signal, which employs a current frame prediction block 150 in accordance with the present invention. As shown, current frame data is fed as an input digital video signal to a first frame memory 100 which stores the input digital video signal. The input digital video signal is also coupled to the current frame prediction block 150 through a line L10. Actually, the input digital video signal is read, on a block-by-block basis, from the first frame memory 100 and provided to a subtractor 102 through a line L11. The block size of the input digital video signal typically ranges between 8×8 and 32×32 pixels.

The current frame prediction block 150 of the present invention initially serves to determine a set of motion vectors for a set of feature points by employing the feature point based motion estimation which will be described hereinafter with reference to FIGS. 2 and 3, wherein a feature points are selected in a processing region of a reconstructed previous frame. After determining the motion vectors for the whole feature points through the use of a current frame signal on the line L10 retrieved from the first frame memory 100 and a previous frame signal on a line L12 from a second frame memory 124, the motion vectors are used for predicting the current frame on a pixel-by-pixel basis in order to generate a predicted current frame signal onto a line L30. The motion vectors and region information representing the region location are also coupled through a line L20 to an entropy coder 107.

The predicted current frame signal on the line L30 is subtracted from a current frame signal on the line L11 at the subtractor 102, and the resultant data, i.e., an error signal denoting differential pixel values, is dispatched to an image signal encoder 105. At the image signal encoder 105, the error signal is encoded into a set of quantized transform coefficients, e.g., by using a DCT and any of the known quantization methods. Thereafter, the quantized transform coefficients are transmitted to an entropy coder 107 and an image signal decoder 113.

At the entropy coder 107, the quantized transform coefficients from the image signal encoder 105, the motion vectors and the region information are coded together by using, e.g., a known variable length coding technique; and transmitted to a transmitter (not shown) for the transmission thereof. In the meantime, the image signal decoder 113 converts the quantized transform coefficients from the image signal encoder 105 back into a reconstructed error signal by employing an inverse quantization and an inverse discrete cosine transform. The reconstructed error signal from the image signal decoder 113 and the predicted current frame signal on the line L30 from the current frame prediction block 150 are combined at an adder 115 to thereby provide a reconstructed frame signal to be stored as a previous frame signal in the second frame memory 124.

Figure 2:
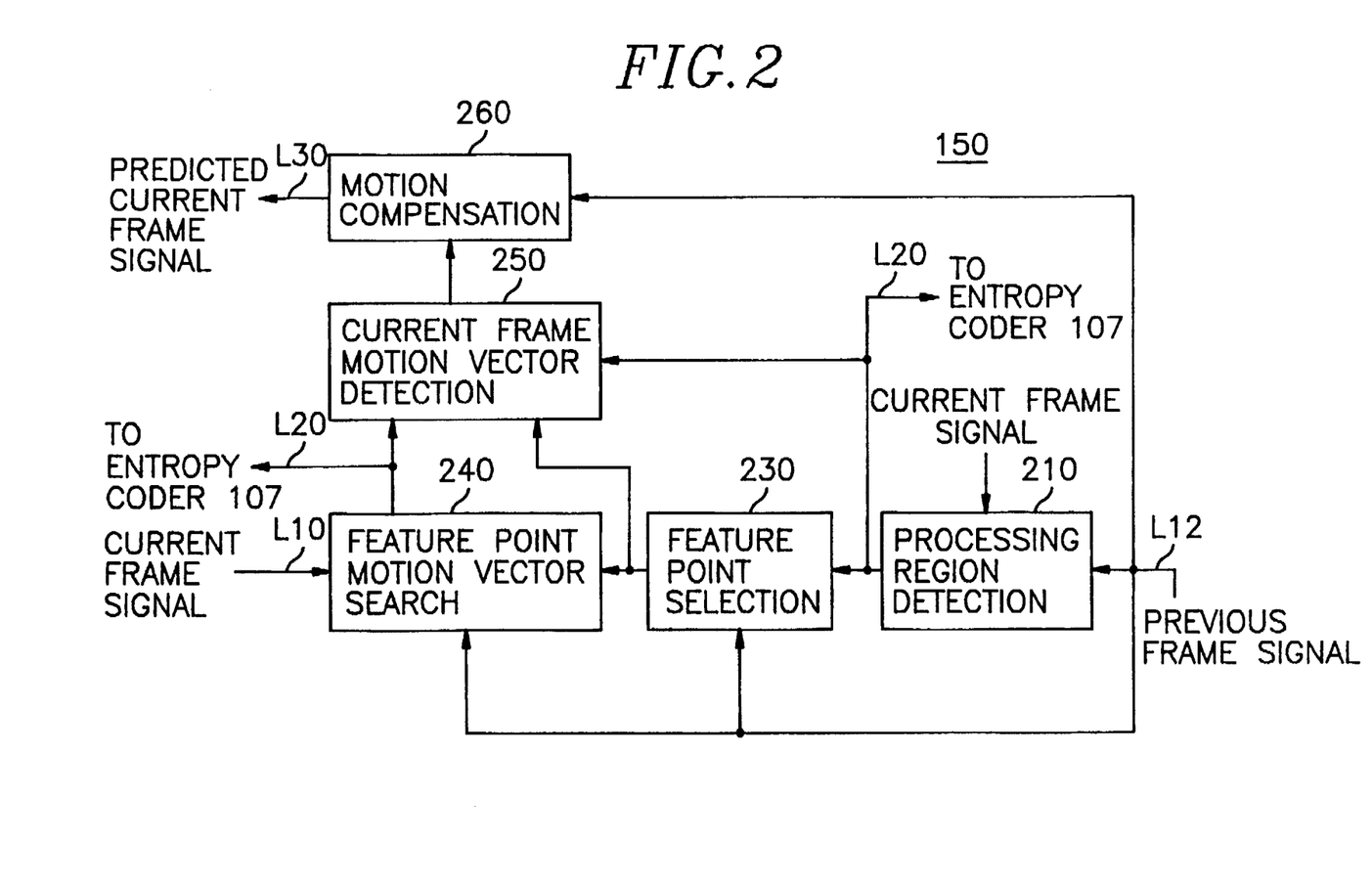
FIG. 2 shows a detailed block diagram of the current frame prediction block of FIG. 1.

Referring to FIG. 2, there are illustrated details of the current frame prediction block 150 shown in FIG. 1. The current frame prediction block 150 is provided with a processing region detection block 210, a feature point selection block 230, a feature point motion vector search block 240, a current frame motion vector detection block 250 and a motion compensation block 260.

The current frame signal on the line L10 from the first frame memory 100 and the previous frame signal on the line L12 from the second frame memory 124 are inputted to the processing region detection block 210. The processing region detection block 210 serves to detect the processing region having a moving object by using the difference between the current frame signal and the previous frame signal. Referring to FIG. 3, there are shown two overlapped exemplary frames 300 (i.e., the current and the previous frames), each frame having 5×7 image blocks. Each of the image blocks includes a plurality of pixels, e.g., 16×16 pixels. Assuming that the overlapped frames include four objects, e.g., three stationary objects 310 to 330 and a moving object 340, and the difference between two frames appears in a region 350 which includes a plurality of image blocks encompassing the moving object 340, the region 350 will be referred as the processing region. After detecting the processing region 350, the processing region detection block 210 generates region information representing the selected processing region based on the location data of the image blocks encompassing or encircling the moving object 340. The region information is then coupled to the feature point selection block 230, the current frame motion vector detection block 250 and the entropy coder 107.

Figure 4A:
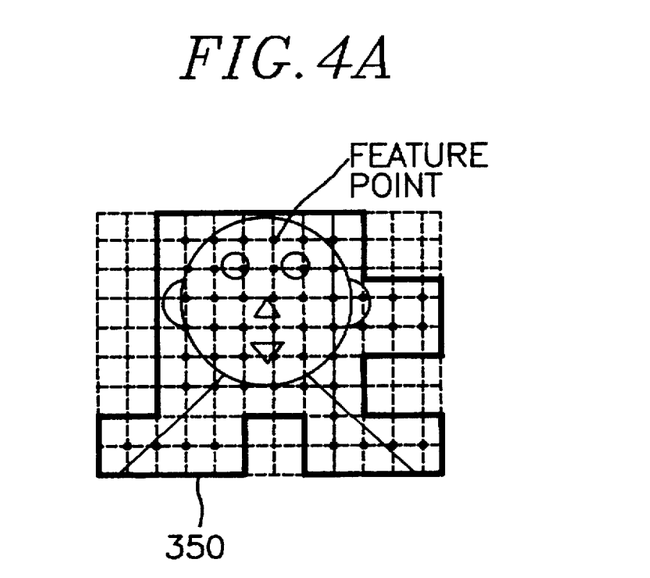
FIGS. 4A and 4B illustrate two types of grids to select feature points.
Figure 4B:
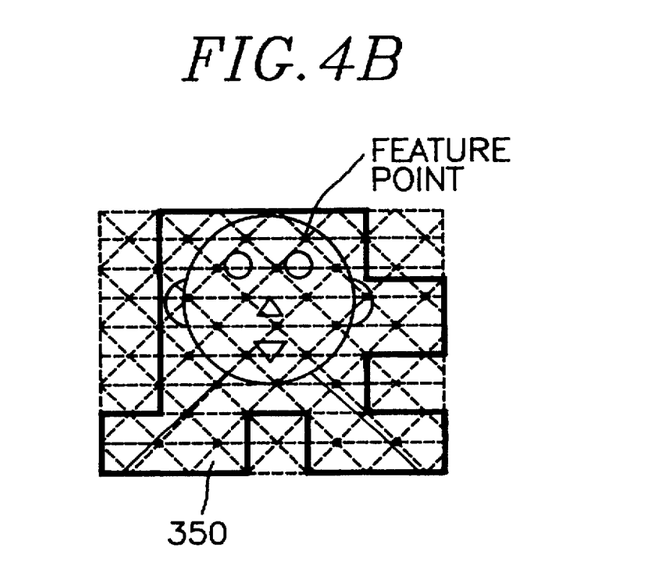
Figure 5A:
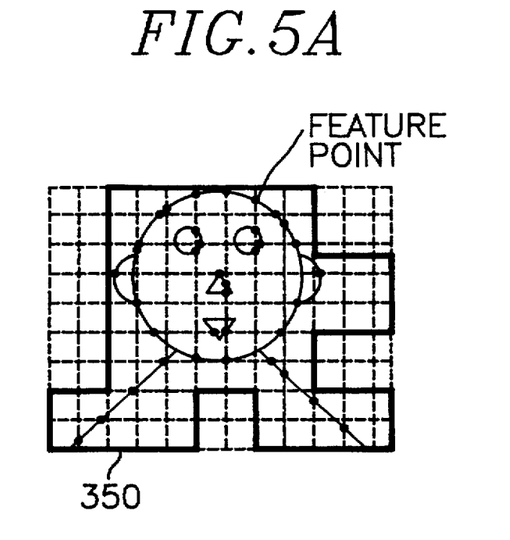
FIGS. 5A and 5B describe a technique for selecting feature points through the use of grids and edges of objects.
Figure 5B:
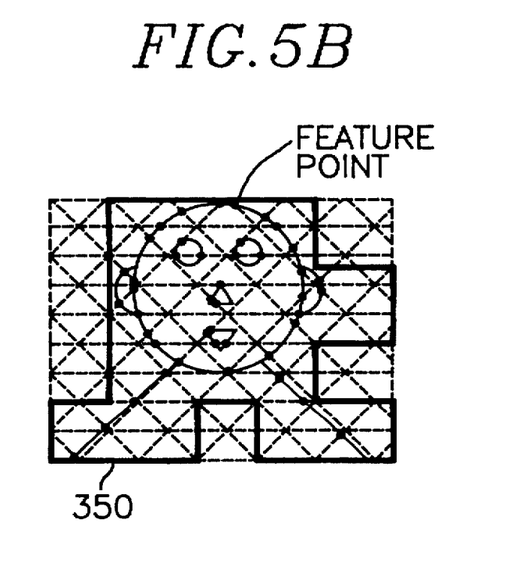

At the feature point selection block 230, a number of feature points are selected among the pixels contained in the processing region of the previous frame signal through the use of the region information from the processing region detection block 210 and the previous frame signal from the second frame memory 124. The feature points are defined as the pixels which are capable of representing the motion of an object in the frame. In a preferred embodiment of the present invention, the feature points are determined by a known grid technique employing one various types of grid, e.g., a rectangular grid or an overlapped hexagonal grid shown in FIGS. 4A and 4B, respectively. As shown in FIGS. 4A and 4B, the feature points are located at the nodes of the grid. In another preferred embodiment of the invention, an edge detection technique is employed together with the above described grid technique as shown in FIGS. 5A and 5B. In this scheme, intersection points of the grid and edge of the object are selected as feature points. The selected feature points from the feature point selection block 230 are inputted to the feature point motion vector search block 240. The feature point selection block 230 also serves to generate position data for the feature points based on the region information, which is also coupled to the feature point motion vector search block 240 and the current frame motion vector detection block 250.

At the feature point motion vector search block 240, a first set of motion vectors for the selected feature points is detected based on the current frame signal on the line 10 and the previous frame signal on the line 12. Each of the motion vectors in the first set represents a spatial displacement between a feature point in the previous frame and a most similar pixel thereto in the current frame. There are numerous processing algorithms available for use to detect the motion vectors on a pixel-by-pixel basis. In the preferred embodiments of the invention, there is used a block matching algorithm: that is, when a feature point block of the previous frame, having a feature point at the centre thereof, is retrieved via the line L12 from the second frame memory 124 shown in FIG. 1. Thereafter, a motion vector for the feature point block is determined after a similarity calculation by using an error function, e.g., MAE (mean absolute error) or MSE (mean square error), between the feature point block and each of a plurality of equal-sized candidate blocks included in a generally larger search region of P×Q, e.g., 10×10, pixels of the current frame retrieved from the first frame memory 100 shown in FIG. 1, wherein the motion vector is a displacement between the feature point blocks and a candidate block which yields a minimum error function. The determined motion vector is then set as the motion vector of the feature point. The motion vectors for the feature points are applied, as the first set of motion vectors, to the current frame motion vector detection block 250 and the entropy coder 107 shown in FIG. 1 through the line 20.

At the current frame motion vector detection block 250, a second set of motion vectors for all of the pixels contained in the current frame is determined through the use of the first set of motion vectors from the feature point motion vector search block 240, the position data of the feature points from the feature point selection block 230 and the region information from the processing region detection block 210. In accordance with the preferred embodiment of the present invention, the second set of motion vectors are determined by using a known affine transform. In order to determine the second set of motion vectors, quasi-feature points are determined first, wherein the quasi-feature points represent the pixels of the current frame shifted from the feature points contained in the processing region of the previous frame by the first set of motion vectors. After determining the quasi-feature points (QP's), a plurality of non-overlapping polygons, e.g., triangle, are defined by connecting, e.g., three neighboring quasi-feature points as shown in FIG. 6A.

In the preferred embodiment of the invention, formation of unique triangles from a set of arbitrarily distributed QP's is obtained by adding a new line segment between one of QP's and its nearest QP, starting from a QP of the highest priority. For instance, if seven QP's, e.g., QP1 to QP7, are randomly distributed in a rectangular processing region of a current frame of 6×5 pixels as shown in FIG. 6A, formation of line segments for the QP's is performed in a sequence of QP1 to QP7, wherein the numerals in the parentheses represent x and y coordinates of a QP measured from the origin, e.g., left-top corner pixel P1, of the rectangular processing region. That is, priority is given to the QP's in an ascending order of their y values. If more than one QP has a same y value, priority will be given to the QP's in an ascending order of their x values.

Figure 6A:
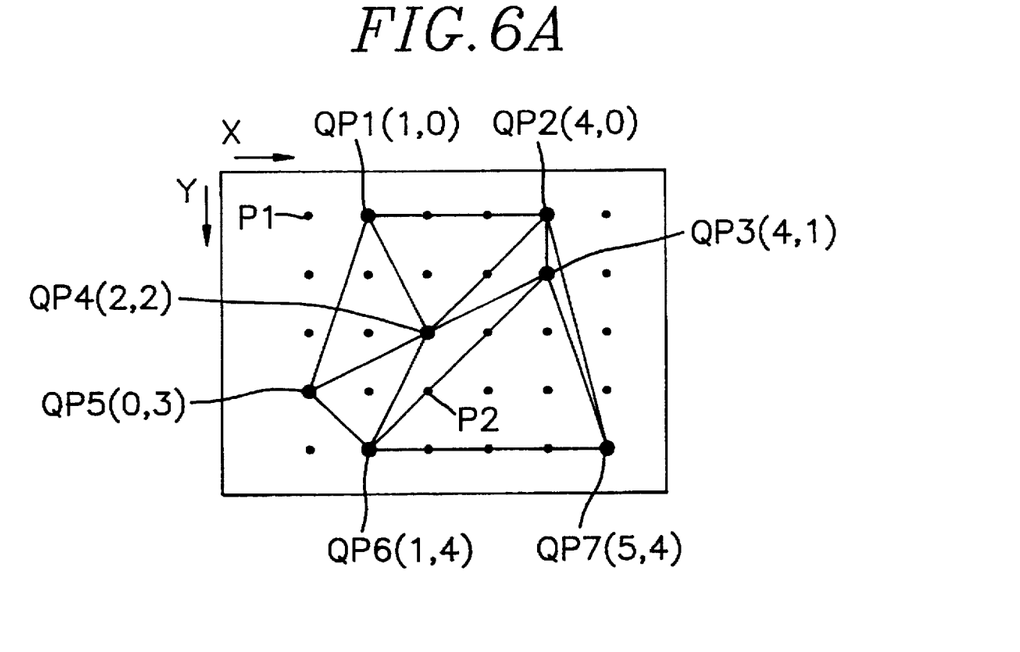
FIGS. 6A and 6B explain how the current frame motion vector is detected in accordance with the present invention.

Specifically, for the set of QP's illustrated in FIG. 6A, a line segment $\overline{QP1QP4}$ is selected for QP1 first, followed by a line segment $\overline{QP2QP3}$ for QP2. $\overline{QP3QP4}$ is determined as a line segment for QP3 because $\overline{QP2QP3}$ has been already selected. The QP of a next priority, i.e., QP4, has two nearest QP's, i.e., QP5 and QP6. In such a case, $\overline{QP4QP5}$ is selected because QP5 has a higher priority. Similarly, line segments $\overline{QP5QP6}$, $\overline{QP6QP4}$ and $\overline{QP7QP3}$ are determined for QP5, QP6 and QP7 in sequence. These processes are repeated until all the line segments are found with the condition that a newly added line segment may not overlap or intersect any of the previously selected line segments.

Thereafter, the second set of the motion vectors is calculated by using an affine transformation technique. As well known in the art, an arbitrary sequence of rotation, translation and scale changes of a moving object can be represented by the affine transformation.

Figure 6B:
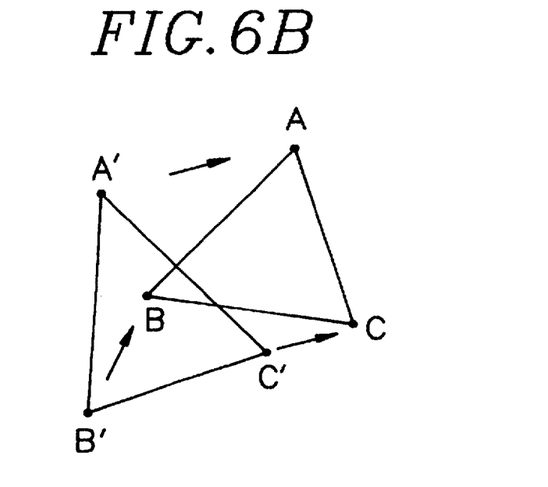

Assuming, as shown in FIG. 6B, that three pixels A, B and C in the current frame are determined as quasi-feature points corresponding to their respective feature points A', B' and C' in the previous frame, pixels in a triangle ABC of the current frame may be correlated to those in the triangle A'B'C' of the previous frame by the affine transformation defined as:

$$\begin{bmatrix} x' \\ y' \end{bmatrix} = \begin{bmatrix} a & b \\ c & d \end{bmatrix} \begin{bmatrix} x \\ y \end{bmatrix} + \begin{bmatrix} e \\ f \end{bmatrix} \qquad \text{Eq. (1)}$$

wherein (x, y) represents the x and y coordinates of a pixel within the current frame and (x', y'), the coordinates of a predicted position in the previous frame; and a to f are affine transform coefficients.

Those six affine transform coefficients are calculated by solving six linear equations obtained from three sets of related feature and quasi-feature points, i.e., A'—A, B'—B and C'—C. Once the affine transform coefficients are known, each of the remaining pixels in the triangle ABC can be mapped onto a position in the triangle A'B'C' through the use of Eq. 1. In this manner, pixels in each triangle within the current frame can be predicted from those of the previous frame. Pixels on the boundary of two contiguous triangles, e.g., P1 shown in FIG. 6A, can be predicted from either one of the two triangles.

Thereafter, a motion vector for each of the pixels, P(x, y), in the current frame is determined from a displacement between the pixel P and its prediction P'(x', y') as:

$$M_x = x' - x$$
$$M_y = y' - y \qquad \text{Eq.(2)}$$

wherein $M_x$ and $M_y$ are the x and y components of the motion vector for the pixel P, respectively.

In the preferred embodiment of the invention, motion vectors for the pixels lying outside the processing region in the current frame are set to zeros.

Referring back to FIG. 2, provided from the current frame motion vector detection block 250 to the motion compensation block 260 is the second set of motion vectors for the pixels of the current frame.

The motion compensation block 260 retrieves each value of the pixels to be contained in a predicted current frame from the second frame memory 124 shown in FIG. 1 by using each of the motion vectors contained in the second set, thereby providing the predicted current frame signal to the subtractor 102 and the adder 115 shown in FIG. 1 via the line L30. In case both components of a motion vector, i.e., $M_x$ and $M_y$, are not integers, the predicted pixel value can be obtained by interpolating pixel values of the pixels neighboring the position designated by the motion vector.

In another preferred embodiment of the invention, the predicted positions, which are obtained from Eq. 1, can be directly provided from the current frame motion vector detection block 250 to the motion compensation block 260 without resorting to the second set of motion vectors. Predicted positions for the pixels residing outside the processing region in the current frame are set to have identical positions to those of respective pixels lying outside the processing region of the previous frame. The motion compensation block 260 then retrieves pixel values, which correspond to the predicted positions, from the second frame memory 124, thereby providing the predicted current frame signal onto the line L30.

Figure 7:
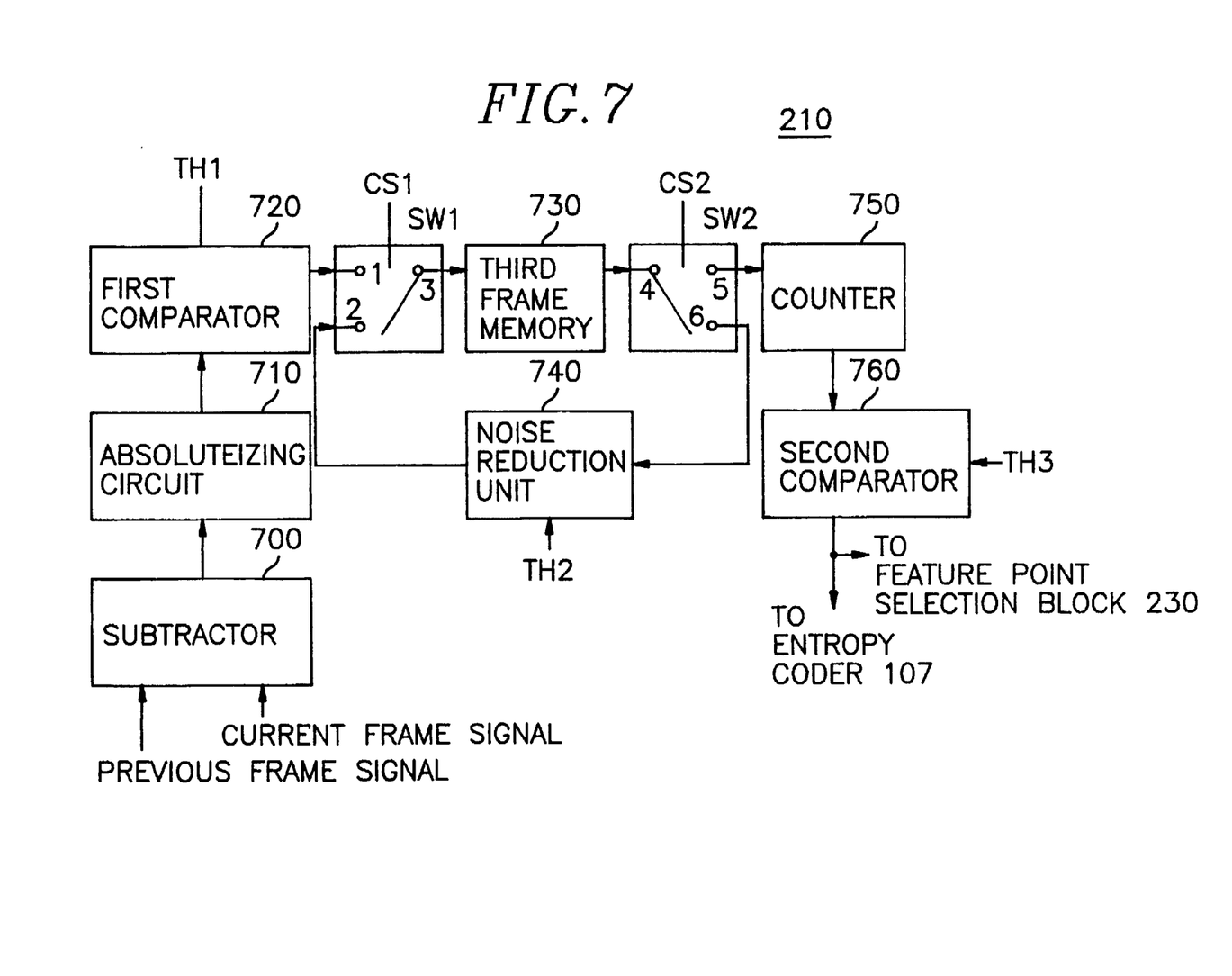
FIG. 7 depicts a detailed block diagram of the processing region detection block of FIG. 2.

Referring to FIG. 7, there is illustrated a block diagram, in accordance with the present invention, of the processing region detection block 210 depicted in FIG. 2. Both of the current frame signal from the first frame memory 100 and the previous frame signal from the second frame memory 124 are fed to a subtractor 700.

The subtractor 700 serves to calculate the difference (A shown in FIG. 3) between the pixel values of the current frame signal and the corresponding pixel values of the previous frame signal on a pixel-by-pixel basis. The resultant data, i.e., a frame difference signal, from the subtractor 700 is dispatched to an absolutizing circuit 710. The absolutizing circuit 710 converts each pixel difference value included in the frame difference signal into its absolute value. Thereafter, an absolutized frame difference signal is applied to a first comparator 720 which compares each absolutized pixel difference value of the absolutized frame difference signal with a predetermined threshold value TH1. Thereafter, the absolutized frame difference signal is converted to have two types of data, e.g., "1" or "0". That is, if each absolutized pixel difference value is smaller than TH1, the absolutized pixel difference value is set to "0". Otherwise, the absolutized pixel difference value is set to "1". The converted frame difference signal from the first comparator 720 is fed to a terminal 1 of a switch SW1 on a block-by-block basis.

At the switch SW1, the terminal 1 is connected to a terminal 3 which links the first comparator 720 to a third frame memory 730 until the third frame memory 730 is filled with the converted frame difference signal completely, wherein the switch SW1 is controlled by a control signal CS1 from a controller (not shown). If the third frame memory 730 is filled, the terminal 1 of the switch SW1 is separated from the terminal 3 and a terminal 2 is then coupled to the terminal 3. In the meanwhile, a control signal CS2 is applied to a switch SW2 and a terminal 4 of the switch SW2 is connected to a terminal 6 which links the third frame memory 730 to a noise reduction unit 740. The converted frame difference signal stored in the third frame memory 730 is fed to the noise reduction unit 740 through the terminals 4 and 6.

At the noise reduction unit 740, spot noises which may be contained in the converted frame difference signal are detected and removed. The spot noises may be easily detected by comparing the difference value of pixels with an average or median difference value of the neighboring pixels. However, since each pixel difference value of the converted frame difference signal is represented by the two types of data, i.e., "0" and "1", for the detection of the spot noises, the noise reduction unit 740 employs a known windowing method. That is, the noise reduction unit 740 counts the pixel difference values of "1" within a suitably chosen window, which includes the target pixel difference value of "1" to be processed at the center thereof. And then the count number is compared with a predetermined number TH2. If the count number is smaller than the predetermined number TH2, the target pixel difference value is confirmed as the spot noise and "0" is assigned to the target pixel difference value by using an updating operation via the terminals 2 and 3. Otherwise, the target pixel difference value will not be changed.

When the target pixel difference values are updated, the controller (not shown) generates the control signal CS2 for controlling the switch SW2. That is, at the switch SW2, the terminal 4 is connected to a terminal 5 and the noise-reduced frame difference signal from the third frame memory 730 is transmitted to a counter 750.

At the counter 750, the number of pixel difference values of "1" contained in each image block is counted. Thereafter, the counted number of pixel difference values of "1" contained in each image block is sequentially fed to a second comparator 760. At the second comparator 760, the counted number of pixel difference value of "1" is compared with a predetermined number TH3. If the counted number is greater than the predetermined number TH3, "1" is assigned as a block representative value to the image block. Otherwise, "0" is assigned as the block representative value to the image block.

Figure 3:
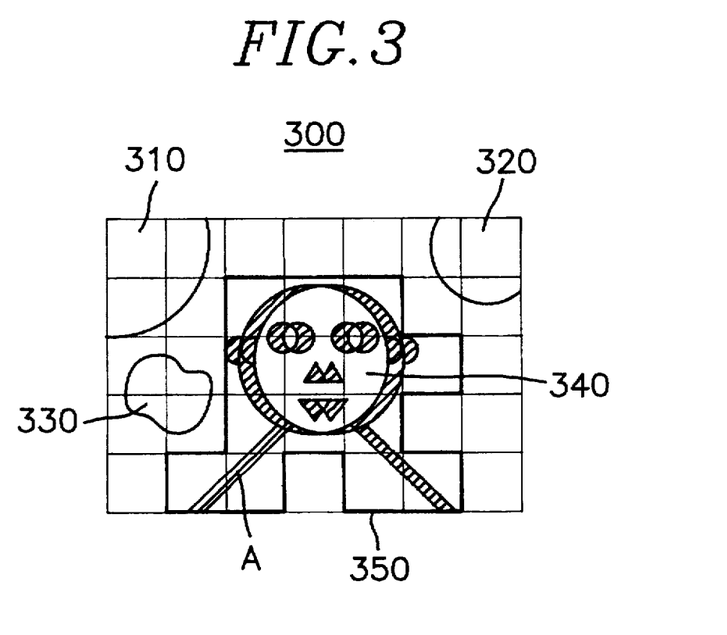
FIG. 3 represents two overlapped exemplary frames having a moving object.
Figure 8:
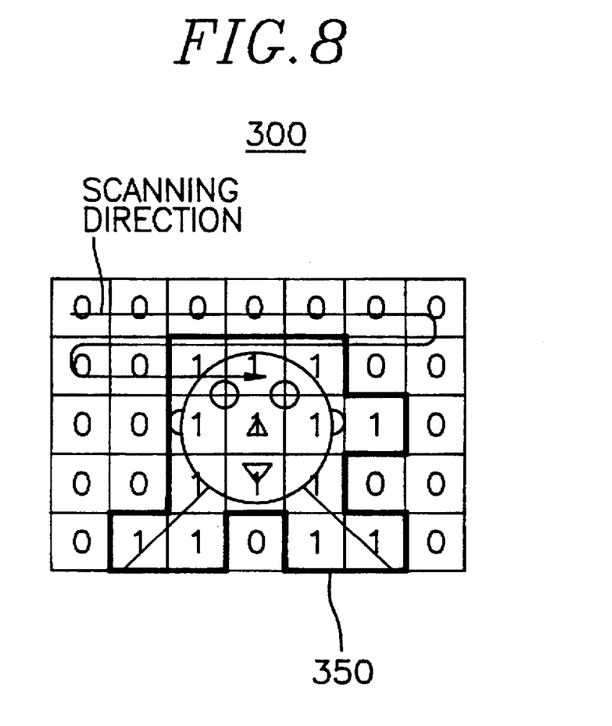
FIG. 8 represents an array of block representative values based on the difference between the two frames shown in FIG. 3.

Referring to FIG. 8, there is demonstrated an array of block representative values based on the difference between two frames shown in FIG. 3. As shown, "1" is assigned to the image blocks contained in the processing region and "0" is assigned to the other blocks lying outside the processing block. The block representative values of the array are scanned sequentially as the region information which is fed to the feature point selection block 230 shown in FIG. 2 and the entropy coder 107 shown in FIG. 1.

As may be seen from the above, since the motion vector detector initially detects a processing region encompassing a moving object by using the difference between the current frame and the previous frame, the inventive encoder can obtain the motion vectors for a limited number of feature points selected from the processing region to thereby greatly reduce the computational burden and amount of motion vectors to be transmitted, thereby improving the coding efficiency.

While the present invention has been shown and described with respect to the particular embodiments, it will be apparent to those skilled in the art that many changes and modifications may be made without departing from the spirit and scope of the invention as defined in the appended claims.

What is claimed is:

1. An apparatus, for use in a motion-compensated video signal encoder, for determining a predicted current frame based on a current frame and a previous frame of a digital video signal, comprising:

region detection means for calculating a difference between the current frame and the previous frame and for detecting a processing region encompassing a moving object from the previous frame based on the calculated difference to generate region information representing the detected processing region, wherein the processing region has a plurality of image blocks contained in the previous frame and the image blocks are determined by using the calculated difference, wherein said region detection means includes:

means for calculating the difference between the current and the previous frames on a pixel-by-pixel basis to generate a frame difference signal wherein the frame difference signal includes N×M blocks, each block having P×Q pixel difference values and N, M, P and Q are positive integers;

means for absolutizing the frame difference signal to generate an absolutized frame difference signal;

means for comparing the absolutized frame difference signal with a predetermined value to convert the absolutized frame difference signal into a converted frame difference signal, wherein, when a pixel difference value of the absolutized frame difference signal is smaller than the predetermined value, "0" is assigned as the pixel difference value and, otherwise, "1" is assigned as the pixel difference value;

means for counting the number of "1"'s contained in each block of the converted frame difference signal; and     means for comparing the counted number for each block with a predetermined number to generate the region information having sequentially arranged N×M block representative values, wherein, when the counted number for a block is smaller than the predetermined value, "0" is assigned as a block representative value of the region information and, otherwise, "1" is assigned as the block representative value;

feature point selection means for selecting a number of pixels from the pixels contained in the detected processing region as feature points based on the region information;

first motion vector detection means for detecting a first set of motion vectors between the current and the previous frames, each of the first set of motion vectors representing a motion for each of the feature points;

second motion vector detection means for producing a second set of motion vectors for all of the pixels contained in the current frame by using the first set of motion vectors; and     motion compensation means for assigning the value of each of the pixels in the previous frame, said each of the pixels corresponding to one of the pixels in the current frame through one of the second set of motion vectors, as the value of said one of the pixels in the current frame, to thereby determine the predicted current frame.

2. The apparatus as recited in claim 1, wherein the second set of motion vectors includes a third set of motion vectors for all of the pixels contained in the processing region of the current frame, which is obtained based on the first set of motion vectors, and a fourth set of motion vector for the pixels lying outside the processing region of the current frame, which is made to consist of zero vectors.

3. The apparatus as recited in claim 2, wherein said feature point selecting means includes means for selecting a number of feature point pixels from the processing region of the previous frame by using a grid method which extracts pixels located at nodes of the grid as the feature point pixels.

4. The apparatus as recited in claim 3, wherein the grid is a rectangular grid.

5. The apparatus as recited in claim 4, wherein the grid is a hexagonal grid.

6. The apparatus as recited in claim 2, wherein said feature point selecting means includes means for selecting a number of feature point pixels from the processing region of the previous frame by using a grid and edge detection method which extracts pixels located at intersection points of the grid and the edge of the moving object as the feature point pixels.

7. The apparatus as recited in claim 6, wherein the third set of the motion vectors is obtained by using a known affine transform.

8. The apparatus as recited in claim 7, wherein said feature point selecting means includes means for selecting a number of feature point pixels from the processing region of the previous frame by using a grid and edge detection method which extracts pixels located at intersection points of the grid and the edge of the moving object as the feature point pixels.

9. The apparatus as recited in claim 8, wherein the third set of the motion vectors is obtained by using a known affine transform.

10. A video signal encoding apparatus for reducing a transmission rate of a digital video signal, said digital video signal having a plurality of frames including a current frame and a previous frame, comprising:

memory means for storing the previous frame of the digital video signal;

region detection means for calculating a difference between the current frame and the previous frame and for detecting a processing region encompassing a moving object from the previous frame based on the calculated difference to generate region information representing the detected processing region, wherein the processing region has a plurality of image blocks contained in the previous frame and the image blocks are determined by using the calculated difference, wherein said region detection means includes:

means for calculating the difference between the current and the previous frames on a pixel-by-pixel basis to generate a second frame difference signal wherein the second frame difference signal includes N×M blocks, each block having P×Q pixel difference values and N, M, P and Q are positive integers;

means for absolutizing the second frame difference signal to generate an absolutized frame difference signal;

means for comparing the absolutized frame difference signal with a predetermined value to convert the absolutized frame difference signal into a converted frame difference signal, wherein, when a pixel difference value of the absolutized frame difference signal is smaller than the predetermined value, "0" is assigned as the pixel difference value and, otherwise, "1" is assigned as the pixel difference value;

means for counting the number of "1"'s contained in each block of the converted frame difference signal; and     means for comparing the counted number for each block with a predetermined number to generate the region information having sequentially arranged N×M block representative values, wherein, when the counted number for a block is smaller than the predetermined value, "0" is assigned as a block representative value of the region information and, otherwise, "1" is assigned as the block representative value;

feature point selection means for selecting a number of pixels from the pixels contained in the detected processing region as feature points based on the region information;

first motion vector detection means for detecting a first set of motion vectors between the current and the previous frames, each of the first set of motion vectors representing a motion for each of the selected pixels;

second motion vector detection means for producing a second set of motion vectors for all of the pixels contained in the current frame by using the first set of motion vectors;

motion compensation means for assigning the value of each of the pixels in the previous frame, said each of the pixels corresponding to one of the pixels in the current frame through one of the second set of motion vectors, as the value of said one of the pixels in the current frame, to thereby determine the predicted current frame; and coding means for encoding a difference signal representing a difference between the current frame and the predicted current frame, the first set of motion vectors and the region information to thereby generate the digital video signal.

11. The apparatus as recited in claim 10, wherein the second set of motion vectors includes a third set of motion vectors for all of the pixels contained in the processing region of the current frame, which is obtained based on the first set of motion vectors, and a fourth set of motion vector for the pixels lying outside the processing region of the current frame, which is made to consist of zero vectors.

12. The apparatus as recited in claim 11, wherein the coding means includes:

means for generating a first frame difference signal by subtracting the predicted current frame from the current frame on a pixel-by-pixel basis;

means for encoding the first frame difference signal by using a discrete cosine transform and quantization circuit;

means for decoding the encoded differential pixel values to thereby provide a reconstructed frame difference signal;

means for providing a reconstructed current frame signal as the previous frame signal by combining the reconstructed frame difference signal and the predicted current frame signal; and means for statistically coding the first frame difference signal, the first set of motion vectors and the region information.

13. The apparatus as recited in claim 12, wherein said feature point selecting means includes means for selecting a number of feature point pixels from the processing region of the previous frame by using a grid method which extracts pixels located at nodes of the grid as the feature point pixels.

14. The apparatus as recited in claim 13, wherein the grid is a rectangular grid.

15. The apparatus as recited in claim 14, wherein the grid is a hexagonal grid.

* * * * *